(12) United States Patent
Okuno

(10) Patent No.: US 7,728,561 B2
(45) Date of Patent: Jun. 1, 2010

(54) APPARATUS FOR CONTROLLING POWER GENERATION FOR VEHICLE

(75) Inventor: Tomoya Okuno, Nishio (JP)

(73) Assignee: Denso Corporation, Kariya (JP)

( * ) Notice: Subject to any disclaimer, the term of this patent is extended or adjusted under 35 U.S.C. 154(b) by 335 days.

(21) Appl. No.: 12/068,641

(22) Filed: Feb. 8, 2008

(65) Prior Publication Data
US 2008/0191482 A1 Aug. 14, 2008

(30) Foreign Application Priority Data
Feb. 13, 2007 (JP) ............................. 2007-032099

(51) Int. Cl.
H02P 11/00 (2006.01)
H02P 9/00 (2006.01)
H02H 7/06 (2006.01)

(52) U.S. Cl. ............................. 322/37; 322/28; 322/29; 322/36

(58) Field of Classification Search .................. 322/28, 322/29, 36, 37
See application file for complete search history.

(56) References Cited

U.S. PATENT DOCUMENTS

| | | | | |
|---|---|---|---|---|
| 3,551,773 A | * | 12/1970 | Dannettell et al. | 318/270 |
| 4,328,427 A | * | 5/1982 | Bond | 290/3 |
| 4,931,717 A | * | 6/1990 | Gray et al. | 323/299 |
| 6,424,799 B1 | * | 7/2002 | Gilmore | 388/811 |
| 6,456,048 B2 | * | 9/2002 | Taniguchi et al. | 322/28 |
| 6,548,990 B2 | * | 4/2003 | Okuno et al. | 322/36 |
| 6,614,207 B2 | * | 9/2003 | Maehara et al. | 322/28 |
| 6,700,354 B2 | * | 3/2004 | Okuno et al. | 322/29 |
| 6,737,835 B2 | * | 5/2004 | Taniguchi | 322/29 |
| 6,741,067 B2 | * | 5/2004 | Taniguchi et al. | 322/28 |
| 6,836,614 B2 | * | 12/2004 | Gilmore | 388/811 |
| 7,071,656 B2 | * | 7/2006 | Taniguchi | 322/28 |

(Continued)

FOREIGN PATENT DOCUMENTS

JP    A-5-300669    11/1993

(Continued)

OTHER PUBLICATIONS

English language version of Office Action issued in corresponding Japanese Patent Application No. 2007-032099, mailed Jan. 20, 2009.

*Primary Examiner*—J C Gonzalez
*Assistant Examiner*—Pedro J Cuevas
(74) *Attorney, Agent, or Firm*—Oliff & Berridge, PLC

(57) ABSTRACT

An apparatus for controlling generation of power to be generated by a generator driven by an engine mounted on a vehicle equipped with an electrical load operative on the power from the generator, the generator including a field winding to which current is supplied on the power, and a duty cycle of the current being increased to maintain the power of the generator, the apparatus comprising duty cycle limit means for limiting an increasing rate of the duty cycle in response to an increase in an amount of the load when the engine is in an idle state; rotation frequency detecting means for detecting the rotation frequency of the engine; and limit value deciding means for deciding a limit value for the increasing rate of the duty cycle to a greater value than a limit value corresponding to the idle state, when the rotation frequency detecting means detects a decrease in the rotation frequency.

14 Claims, 3 Drawing Sheets

U.S. PATENT DOCUMENTS

| | | | |
|---|---|---|---|
| 7,112,934 B2 * | 9/2006 | Gilmore | 318/432 |
| 7,170,263 B2 * | 1/2007 | Yamamoto et al. | 322/59 |
| 7,224,148 B2 * | 5/2007 | Watanabe et al. | 322/59 |
| 7,531,992 B2 * | 5/2009 | Inokuchi et al. | 322/28 |
| 2002/0000791 A1 * | 1/2002 | Taniguchi et al. | 322/28 |
| 2002/0036485 A1 * | 3/2002 | Okuno et al. | 322/36 |
| 2002/0089312 A1 * | 7/2002 | Taniguchi et al. | 322/28 |
| 2002/0153856 A1 * | 10/2002 | Gilmore | 318/599 |
| 2003/0015927 A1 * | 1/2003 | Okuno et al. | 310/68 B |
| 2004/0217727 A1 * | 11/2004 | Gilmore | 318/599 |
| 2008/0088282 A1 * | 4/2008 | Inokuchi et al. | 322/28 |
| 2009/0039838 A1 * | 2/2009 | Maehara | 322/19 |
| 2009/0072794 A1 * | 3/2009 | Okuno | 320/145 |
| 2009/0224600 A1 * | 9/2009 | Kizawa et al. | 307/9.1 |

FOREIGN PATENT DOCUMENTS

JP     A-7-23599     1/1995

* cited by examiner

FIG. 2

| DUTY INCREASE LIMIT VALUE (CURRENT) | POWER GENERATOR ROTATION FREQUENCY | PROCESSING BY LRC LIMIT VALUE DECIDING CIRCUIT | DUTY INCREASE LIMIT VALUE DECIDED IN LRC LIMIT VALUE DECIDING CIRCUIT |
|---|---|---|---|
| 33.3% / sec | LESS THAN 2000rpm | α = 0 | 33.3% / sec |
|  | BETWEEN 2000rpm AND 3000rpm | α = 0 | 33.3% / sec |
|  | 3000rpm OR MORE | α = 0 | 1000% / sec |
| 1000% / sec | LESS THAN 2000rpm | WHEN α = 0, α = 1 AND COUNTER Tc STARTS / WHEN α = 1: WHEN Tc < 1.5sec → Tc CONTINUES COUNTING AND α = 1; WHEN Tc ≥ 1.5sec → Tc STOPS, Tc = 0, AND α = 0 | 66.7% / sec |
|  | BETWEEN 2000rpm AND 3000rpm | α = 0 | 66.7% / sec |
|  | 3000rpm OR MORE | α = 0 | 1000% / sec |
| 66.7% / sec | LESS THAN 2000rpm | WHEN α = 0, α = 1 AND COUNTER Tc STARTS / WHEN α = 1: WHEN Tc < 1.5sec → Tc CONTINUES COUNTING AND α = 1; WHEN Tc ≥ 1.5sec → Tc STOPS, Tc = 0, AND α = 0 | 66.7% / sec |
|  | BETWEEN 2000rpm AND 3000rpm | α = 0 | 33.3% / sec |
|  | 3000rpm OR MORE | α = 0 | 1000% / sec |

APPARATUS FOR CONTROLLING POWER GENERATION FOR VEHICLE

CROSS-REFERENCE TO RELATED APPLICATION

This application is related to Japanese Patent Application NO. 2007-32099 filed on Feb. 13, 2007, the contents of which are hereby incorporated by reference.

BACKGROUND OF THE INVENTION

1. Field of the Invention

The present invention relates to an apparatus for controlling power generation for a vehicle mounted on an automobile, truck, and the like.

2. Description of the Related Art

A power generation controller for a vehicle detects the voltage at a control terminal (i.e., an output terminal or the positive terminal of a battery) and compares the detected voltage with a reference value. When the voltage at the control terminal is higher than the reference value, the power generation controller turns OFF a transistor that controls the ON/OFF state of the field current. On the other hand, when the voltage is lower than the reference value, the power generation controller turns the transistor ON. As a result, the power generation controller controls the duty cycle of the field winding and controls the voltage at the control terminal to maintain the voltage at a constant value.

When an electrical load is electrically connected, electric current of an amount corresponding to the connected electrical load is drawn from the battery. The amount by which the voltage drops as a result of the electric current being drawn is mitigated such that the voltage at the control terminal is maintained by increasing the duty cycle of the field winding and increasing the amount of generated power. The control is performed instantly. Therefore, the voltage drop at the control terminal is minimal, and the voltage is maintained at an almost constant value. However, at this time, the power generation torque (driving torque) increases because the field current of the power generator suddenly increases. As a result, engine rotation frequency decreases. Particularly in an idling rotation range, the engine may stall as a result of the decrease in the engine rotation frequency. To prevent the engine from stalling, a following method is known as a conventional technology, as disclosed in Japanese Patent Laid-open Publication No. 05-300669. In this method, the rate at which the duty cycle of the field winding increases is restricted when the field current increases, thereby suppressing a sudden increase in the power generation torque of the power generator. This method suppresses power generation by the power generator. Therefore, torque variations can be suppressed. However, while this function is performed, the amount of generated power becomes insufficient and output voltage from the power generator drops.

When the rotation frequency decreases while the output current from the power generator is constant, the field current is increased to maintain output current. Whether the rate at which the field current increases is suppressed when the rotation frequency decreases, as shown in Japanese Patent Laid-open Publication No. 05-300669, is decided by whether the amount of increasing the field current to be required is greater than a limit value of the rate at which the field current increases. In other words, when the degree of decrease in the rotation frequency is large, the amount of increase in the field current required to offset the decrease in the rotation frequency becomes large. Under these circumstances, it is likely that the increase in field current will exceed the threshold. It is therefore likely that suppression of the rate of increase will be triggered.

SUMMARY OF THE INVENTION

The present invention has been achieved in light of the above-described issue. An object of the present invention is to provide a power generation controller for vehicles that can prevent lamps such as headlamps from flickering when the vehicle decelerates.

To achieve the above-described object, a power generation controller of the invention has a duty cycle limit means that limits an increasing rate of the duty cycle of current in the field winding of the power generator in response to an increase in an amount of the electrical load in the vehicle When the engine of the vehicle is in the idle state. The power generator is driven by the engine of the vehicle and supplies the power to the load.

The power generation controller includes a rotation frequency detecting means and a limit value deciding means. The rotation frequency detecting means detects the rotation frequency of the vehicle engine. The limit value deciding means sets a limit value of the rate at which the duty cycle increases to a value greater than the limit value corresponding with the idle state when a decrease in the rotation frequency of the vehicle engine is detected, based on the result from the rotation frequency detecting means. Because the limit value of the rate at which the duty cycle of the field winding increases is set to a large value when the vehicle decelerates, the limit is not easily reached even when the field current increases during deceleration. As a result, flickering of lamps such as the headlamps caused by a drop in the output voltage can be prevented.

The above-described limit value deciding means preferably decides the limit value to be a first value when the engine rotation frequency detected by the rotation frequency detecting means is higher than a predetermined value. The limit value deciding means preferably decides the limit value to be a second value when the engine rotation frequency is lower than a predetermined value. The limit value deciding means preferably decides the limit value to be a third value that is greater than the second value when the engine rotation frequency decreases from a high-speed side to a low-speed side, crossing the predetermined value. As a result, the limit value can be large in a high rotation range over which the torque variation in the power generator only slightly affects the engine rotation. The limit value can also be large during deceleration. The flickering of the lamps caused by the drop in the output voltage can be prevented.

The limit value deciding means preferably maintains the limit value at the third value from when the engine rotation frequency decreases from a high-speed side to a low-speed side, crossing the predetermined value, to when the engine rotation frequency becomes an idle rotation frequency. As a result, the limit value can become a large number with certainty, until the idle rotation frequency is reached while the vehicle is decelerating. The flickering of the lamps can be prevented.

The limit value deciding means preferably maintains the limit value at the third value from when the engine rotation frequency decreases from the high-speed side to the low-speed side, crossing the predetermined value, to when a predetermined amount of time elapses after the engine rotation frequency reaches the idle rotation frequency. As a result, the limit value can be prevented from switching to the small value for idling, when the increase in the duty cycle of the field winding is being controlled based on the limit value while the vehicle is decelerating.

The rotation frequency detecting means preferably detects the rotation frequency of the vehicle engine based on the rotation frequency of the rotor in the power generator. As a result, an input of a signal related to the engine rotation frequency from an external source is not required. Excessive wiring and interface circuits are not added. Simplification of the structure and reduction in cost can be achieved.

The rotation frequency detecting means preferably detects the rotation frequency of the rotor based on the voltage generated at an armature winding in the power generator. The engine rotation frequency can be detected using the rotation frequency detecting circuit in the mounted power generator. Therefore, a separate circuit for engine rotation frequency detection is not required to be provided. The size of the device can be prevented from increasing.

BRIEF DESCRIPTION OF THE DRAWINGS

FIG. 2 is a diagram of a specific example of a duty increase limit value deciding operation performed by an LRC limit value deciding circuit.

DETAILED DESCRIPTION OF THE PREFERRED EMBODIMENTS

Figure 1:
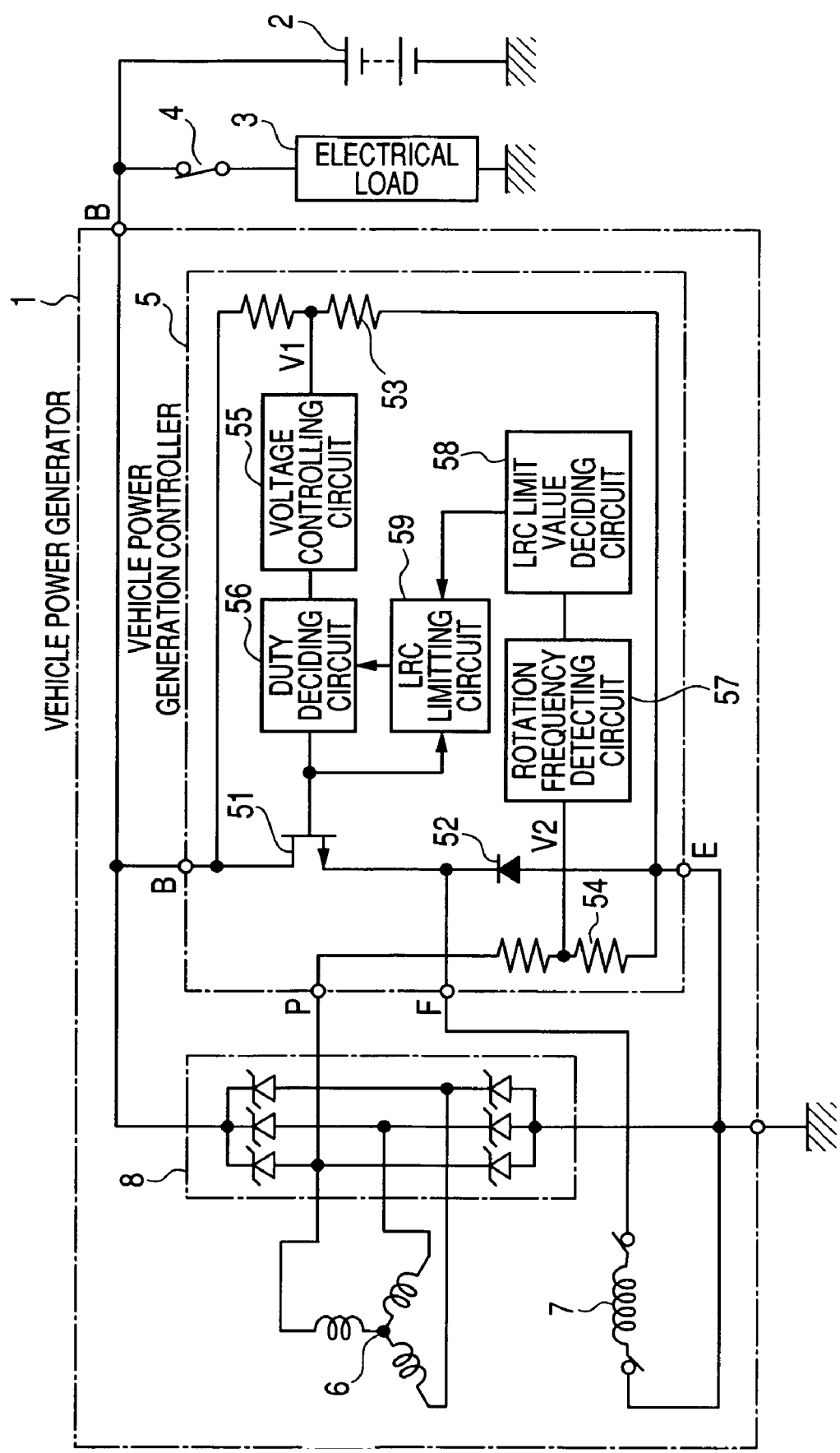
FIG. 1 is a diagram of a configuration of a vehicle power generator according to an embodiment.

An exemplary embodiment of a vehicle power generation controller of the present invention is below described with reference to the attached drawings. FIG. 1 is a diagram of a configuration of a vehicle power generator according to the embodiment. Connections between the vehicle power generator on which the vehicle power generation controlling device is mounted and a battery, electric load, and the like are also shown.

As shown in FIG. 1, a vehicle power generator 1 according to the embodiment includes a vehicle power generation controlling device 5, an armature winding 6, a field winding 7, and a rectifier 8. The vehicle power generator 1 is driven by an engine using a belt and a pulley. The field winding 7 is energized and generates a magnetic field. The field winding 7 is wound around a field pole (not shown) and forms a rotor. The armature winding 6 is a poly-phase winding (for example, a three-phase winding). The armature winding 6 is wound around an armature core and forms an armature. The armature winding 6 generates an electromotive force as a result of change in the magnetic field generated by the field winding 7. An alternating current output induced in the armature winding 6 is supplied to the rectifier 8. The rectifier 8 performs full-wave rectification on the alternating current from the armature winding 6. The output from the rectifier 8 is outputted externally as an output from the vehicle power generator 1. The output from the vehicle power generator 1 is supplied to an electrical load 3, via a battery 2 or an electrical load switch 4. The output from the vehicle power generator 1 changes depending on a rotation frequency of the rotor and also on the field current flowing through the field winding 7. The field current is controlled by the vehicle power generation controller 5.

Next, the vehicle power generation controller 5 will be described in detail. The vehicle power generation controller 5 includes a switching element 51, a reflux diode 52, voltage dividing circuits 53 and 54, a voltage controlling circuit 55, a duty deciding circuit 56, a rotation frequency detecting circuit 57, a load response control (LRC) limit value deciding circuit 58, and an LRC limiting circuit 59. The LRC limiting circuit 59 corresponds to a duty cycle limit means and a duty cycle limit device. The rotation frequency detecting circuit 57 corresponds to a rotation frequency detecting means and a rotation frequency detecting device. The LRC limit value deciding circuit 58 corresponds to a limit value deciding means and a limit value deciding device.

A gate of the switching element 51 is connected to the duty deciding circuit 56. A drain of the switching element 51 is connected to an output terminal (B terminal) of the vehicle power generator 1. A source of the switching element 51 is connected to a grounding terminal (E terminal). The source of the switching element 51 is also connected to the field winding 7, via an F terminal. When the switching element 51 is turned ON, the field current flows through the field winding 7. When the switching element 51 is turned OFF, flow of the field current stops. The reflux diode 52 is connected in parallel with the field winding 7. When the switching element 51 is turned OFF, the field current flowing through the field winding 7 is recycled.

The voltage dividing circuit 53 includes two resistors. The voltage dividing circuit 53 divides the output voltage from the vehicle power generator 1 (or the terminal voltage of the battery 2) (the divided voltage is referred to as "detection voltage V1"). The voltage controlling circuit 55 compares the detection voltage V1 with a predetermined reference voltage. When the detection voltage V1 is lower than the reference voltage, the voltage controlling circuit 55 outputs a high-level signal. When the detection voltage V1 is higher than the reference voltage, the voltage controlling circuit 55 outputs a low-level signal. The duty deciding circuit 56 decides a duty ratio for controlling the ON/OFF state of the switching element 51, in correspondence with the output signal from the voltage controlling circuit 55.

The voltage dividing circuit 54 includes two resistors. The voltage dividing circuit 54 divides a phase voltage of the armature winding 6 appearing at a P terminal (the divided voltage is referred to as "detection voltage V2"). The rotation frequency detecting circuit 57 detects the rotation frequency of the rotor in the vehicle power generator 1 (power generator rotation frequency). Generally, the pulley in the vehicle power generator 1 and a crank pulley of the engine are connected by a belt. The rotation frequency of the engine is proportional to the power generator rotation frequency. In other words, through detection of the power generator rotation frequency, the proportional rotation frequency of the engine can also be detected.

The LRC limit value deciding circuit 58 decides a limit value (the limit value is referred to as "duty increase limit value") for the rate at which the duty cycle (also called "duty" or "duty ratio") of the field winding 7 increases, based on the power generator rotation frequency (engine rotation frequency) detected by the rotation frequency detecting circuit 57. The LRC limiting circuit 59 decides a new target duty cycle based on the duty increase limit value decided by the LRC limit value deciding circuit 58 and the value of the current duty decided by the duty deciding circuit 56. When the target duty cycle is inputted, the duty deciding circuit 56 changes the previous duty cycle to the target duty.

Next, a duty cycle increase limit value deciding operation performed by the LRC limit value deciding circuit 58 will be described. In the conventional vehicle power generator 1, the duty cycle increase limit value is decided based only on the power generator rotation frequency. For example, when the power generator rotation frequency is less than 3000 revolutions-per-minute (rpm), the duty increase limit value is set to 33.3% per second. When the power generator rotation frequency is 3000 rpm or more, the duty increase limit value is set to 1000% per second. In other words, in a low speed range such as an idling rotation frequency, torque variations in the vehicle power generator 1 caused by electrical load input or the like becomes a load on the engine and induces variations in the engine rotation frequency. Therefore, to prevent these variations in the engine rotation, the duty cycle increase limit value of the rate at which the duty cycle increases is suppressed. However, in this case, power generation is also suppressed when the vehicle slows. The output voltage drops. Luminosity of the headlamps and other lamps may fluctuate, causing the headlamps and other lamps to become brighter and dimmer.

Therefore, in the LRC limit value deciding circuit 58 according to the embodiment, a new duty increase limit value is decided based on the current duty increase limit value and the power generator rotation frequency (engine rotation frequency). Thus, the duty increase limit value when the vehicle decelerates is a larger value than the duty increase limit value during ordinary idling. The output voltage drop caused by power generation being suppressed when the vehicle decelerates can be prevented.

FIG. 2 is a diagram of a specific example of the duty increase limit value deciding operation performed by the LRC limit value deciding circuit 58. In FIG. 2, Tc is a count value of a counter included within the LRC limit value deciding circuit 58. α is a parameter indicating the operation state of the counter. α=1 indicates that the counter is performing a clocking operation. A first value in each claim within the scope of claims corresponds with a duty cycle increase limit value of 1000% per second. A second value corresponds with a duty increase limit value of 33.3% per second. A third value corresponds with a duty increase limit value of 66.7% per second. Idling corresponds to a power generator rotation frequency of less than 2000 rpm. A predetermined value of the engine rotation frequency for switching between the first value and the second value corresponds to a power generator rotation frequency of 3000 rpm.

As shown in FIG. 2, when the current duty cycle increase limit value is 33.3% per second and the power generator rotation frequency is less than 3000 rpm, the new duty cycle increase limit value is decided to be 33.3% per second (no change). When the power generator rotation frequency is 3000 rpm or more, the new duty cycle increase limit value is set to 1000% per second.

When the current duty cycle increase limit value is 1000% per second and the power generator rotation frequency is less than 2000 rpm, the counter starts the clocking operation. When the elapsed time is less than 1.5 seconds, the new duty cycle increase limit value is decided to be 66.7% per second. When the elapsed time reaches 1.5 seconds, the new duty increase limit value is decided to be 33.3% per second and the counter stops. At the same time, when the current duty cycle increase limit value is 1000% per second and the power generator rotation frequency is between 2000 rpm and 3000 rpm, the new duty cycle increase limit value is set to be 66.7% per second. When the power generator rotation frequency is 3000 rpm or more, the new duty cycle increase limit value is decided to be 1000% per second (no change).

When the current duty increase limit value is 66.7% per second and the power generator rotation frequency is less than 2000 rpm, the counter starts the clocking operation. When the elapsed time is less than 1.5 seconds, the new duty cycle increase limit value is set to 66.7% per second (no change). When the elapsed time reaches 1.5 seconds, the new duty cycle increase limit value is decided to be 33.3% per second and the counter stops. At the same time, current duty cycle increase limit value is 66.7% per second and the power generator rotation frequency is 2000 to 3000 rpm, the new duty cycle increase limit value is set to 66.7% per second (no change). When the power generator rotation frequency is 3000 rpm or more, the new duty cycle increase limit value is decided to be 1000% per second.

Figure 3:
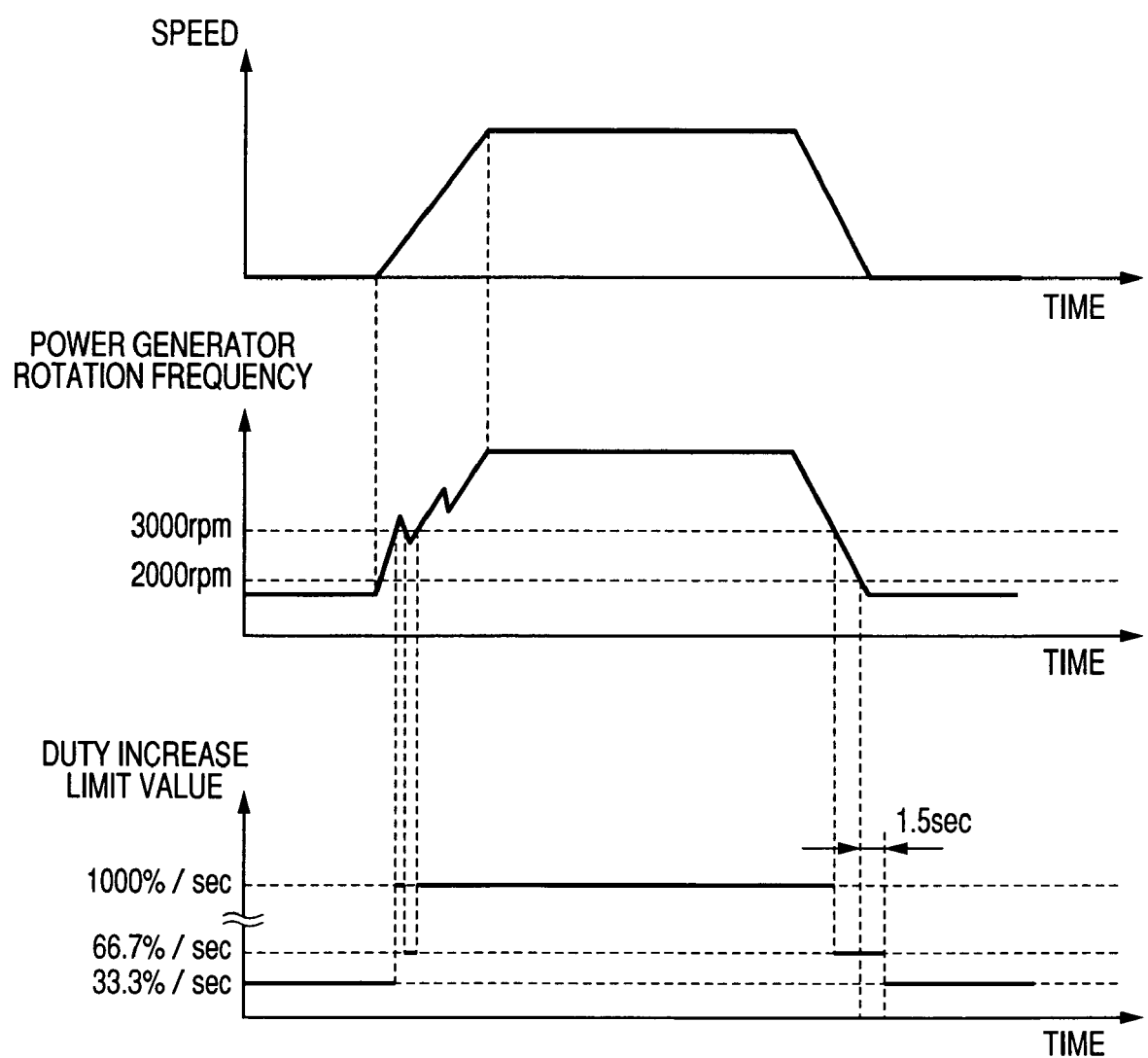
FIG. 3 is a diagram of a relationship between vehicle traveling patterns and decided duty increase limit values.

FIG. 3 shows the relationships between vehicle traveling patterns and the decided duty increase limit values. The diagram shows the vehicle speed, the power generator rotation frequency, and the time variations of the duty cycle increase limit value when the vehicle state changes from stopped to accelerating to traveling at a constant speed to decelerating, to stopped.

When the vehicle state changes as described above, the LRC limit value deciding circuit 58 always decides the duty cycle increase limit value in adherence to combinations shown in FIG. 2, based on the power generator rotation frequency and the current duty increase limit value.

When the vehicle accelerates from the stopped state and travels at a low speed, the duty cycle increase limit value is maintained at 33.3% per second until the power generator rotation frequency exceeds 3000 rpm. When the power generator rotation frequency exceeds 3000 rpm, the duty increase limit value switches to 1000% per second. In FIG. 3, under an assumption of shift changes occurring in the vehicle, the power generator rotation frequency changes such that, after 3000 rpm is exceeded, the power generator rotation frequency temporarily drops below 3000 rpm and exceeds 3000 rpm again. In this case, when the power generator rotation value is less than 3000 rpm, the duty cycle increase limit value is 66.7% per second. When the power generator rotation value exceeds 3000 rpm again, the duty cycle increase limit value is 1000% per second.

When the power generator rotation value is 3000 rpm or more and the vehicle is traveling at a constant speed, the duty cycle increase limit value is maintained at 1000% per second. When the vehicle decelerates, the duty cycle increase limit value is maintained at 1000% per second when the power generator rotation frequency is 3000 rpm or more. When the power generator rotation frequency is less than 3000 rpm, the duty increase limit value is 66.7% per second. When the power generator rotation frequency is less than 2000 rpm, the duty cycle increase limit value switches to 33.3% per second after 1.5 seconds.

In this way, in the vehicle power generation controller 5 according to the embodiment, the limit is not easily reached even when the field current increases during deceleration, because the limit value of the rate at which the duty cycle of the field winding 7 increases when the vehicle is traveling at a low speed is switched to a large value. Therefore, the flickering of lamps such as headlamps caused by the drop in the output voltage can be prevented.

When the engine rotation frequency is higher than the predetermined value (power generator rotation frequency of 3000 rpm corresponding to the engine rotation frequency), the limit value is decided to be the first value (1000% per second). When the engine rotation frequency is lower than the predetermined value, the limit value is decided to be the second value (33.3% per second). When the engine rotation frequency drops from a high-speed side to a low-speed side, crossing the predetermined value, the limit value is the third value (66.7% per second) that is greater than the second value. As a result, in a high rotation range in which the torque variation in the vehicle power generator 1 only slightly affects the engine rotation, the limit value can be large. The flickering of the lamps caused by the drop in the output voltage can be prevented.

Between when the engine rotation frequency drops from the high-speed side to the low-speed side, crossing the predetermined value, to when the engine rotation frequency reaches the idle rotation frequency, the limit value is maintained at the third value. Therefore, the limit value can become a large number reliably, until the idle rotation frequency is reached while the vehicle is decelerating. The flickering of the lamps can be prevented.

The limit value can be maintained at the third value from when the engine rotation frequency drops from the high-speed side to the low-speed side, crossing the predetermined value, until when a predetermined amount of time elapses after the engine rotation frequency reaches the idle rotation frequency (Tc is less than 1.5 seconds). Therefore, the limit value can be prevented from switching to the small value for idling, when the increase in the duty cycle of the field winding 7 is being controlled based on the limit value while the vehicle is decelerating.

Because the rotation frequency of the vehicle engine is detected based on the rotation frequency of the rotor in the vehicle power generator 1, an input of a signal related the engine rotation frequency from an external source is not required. Excessive wiring and interface circuits are not added. Therefore, simplification of the structure and reduction in cost can be achieved. Because the rotation frequency of the rotor is detected based on the voltage generated at the armature winding 6 in the vehicle power generator 1, the engine rotation frequency can be detected using the rotation frequency detecting circuit 57 in the mounted vehicle power generator 1. Therefore, a separate circuit for engine rotation frequency detection is not required to be provided. The size of the device can be prevented from increasing.

The present invention is not limited to the above-described embodiment. Various variation embodiments can be made within the spirit of the invention. According to the embodiment above, the setting values of the duty increase limit value, the power generator rotation frequency, the counted time during deceleration, and the like are described in the specific example in FIG. 2. However, other combinations can be used for these values.

What is claimed is:

1. An apparatus for controlling generation of power to be generated by a generator driven by an engine mounted on a vehicle equipped with an electrical load operative on the power from the generator, the generator including a field winding to which current is supplied on the power, and a duty cycle of the current being increased to maintain the power of the generator, the apparatus comprising:

duty cycle limit means for limiting an increasing rate of the duty cycle in response to an increase in an amount of the load when the engine is in an idle state;

rotation frequency detecting means for detecting the rotation frequency of the engine; and limit value deciding means for deciding a limit value for the increasing rate of the duty cycle to a greater value than a limit value corresponding to the idle state, when the rotation frequency detecting means detects a decrease in the rotation frequency.

2. The apparatus according to claim 1, wherein:

the limit value deciding means is adapted to decide the limit value to be a first value when the rotation frequency detected by the rotation frequency detecting means is equal to or more than a predetermined value, to decide the limit value to be a second value when the rotation frequency is lower than the predetermined value, and to decide the limit value to be a third value that is greater than the second value when the rotation frequency decreases from a high-speed side to a low-speed side crossing the predetermined value.

3. The apparatus according to claim 2, wherein:

the limit value deciding means is adapted to maintain the limit value at the third value from when the rotation frequency decreases from a high-speed side to a low-speed side crossing the predetermined value, to when the rotation frequency becomes an idle rotation frequency.

4. The apparatus according to claim 3, wherein:

the limit value deciding means is adapted to maintain the limit value at the third value from when the rotation frequency decreases from a high-speed side to a low-speed side crossing the predetermined value, to when a predetermined amount of time elapses after the rotation frequency reaches the idle rotation frequency.

5. The apparatus according to claim 1, wherein:

the rotation frequency detecting means is adapted to detect the rotation frequency of the engine based on a rotation frequency of a rotor in the generator.

6. The apparatus according to claims 2, wherein:

the rotation frequency detecting means is adapted to detect the rotation frequency of the engine based on a rotation frequency of a rotor in the generator.

7. The apparatus according to claim 3, wherein:

the rotation frequency detecting means is adapted to detect the rotation frequency of the engine based on a rotation frequency of a rotor in the generator.

8. The apparatus according to claim 4, wherein:

the rotation frequency detecting means is adapted to detect the rotation frequency of the engine based on the rotation frequency of the rotor in the generator.

9. The apparatus according to claim 5, wherein:

the rotation frequency detecting means is adapted to detect the rotation frequency of the rotor based on the voltage generated at the armature winding in the generator.

10. The apparatus according to claim 6, wherein:

the rotation frequency detecting means is adapted to detect the rotation frequency of the rotor based on the voltage generated at the armature winding in the generator.

11. The apparatus according to claim 7, wherein:

the rotation frequency detecting means is adapted to detect the rotation frequency of the rotor based on the voltage generated at the armature winding in the generator.

12. The apparatus according to claim 8, wherein:

the rotation frequency detecting means is adapted to detect the rotation frequency of the rotor based on the voltage generated at the armature winding in the generator.

13. A device for controlling generation of power to be generated by a generator driven by an engine mounted on a vehicle equipped with an electrical load operative on the power from the generator, the generator including a field winding to which current is supplied on the power, and a duty cycle of the current being increased to maintain the power of the generator, the device comprising:

a duty cycle limit device that limits an increasing rate of the duty cycle in response to an increase in an amount of the load when the engine is in an idle state;

a rotation frequency detecting device that detects the rotation frequency of the engine; and a limit value deciding device that decides a limit value for the increasing rate of the duty cycle to a greater value than a value corresponding to the idle state, when the rotation frequency detecting means detected a decrease in the rotation frequency.

14. A method for controlling generation of power to be generated by a generator driven by an engine mounted on a vehicle equipped with an electrical load operative on the power from the generator, the generator including a field winding to which current is supplied on the power, a duty cycle of the current being increased to maintain the power of the generator, the method comprising steps of:

limiting an increasing rate of the duty cycle when the engine is in an idle state;

detecting rotation frequency the engine; and deciding a limit value for the increasing rate of the duty cycle to a greater value than a value corresponding to the idle state, when the rotation frequency detecting means detected a decrease in the rotation frequency.

* * * * *